United States Patent Office 2,863,806
Patented Dec. 9, 1958

2,863,806

17α HYDROXYLATION OF STEROIDS BY TRICHODERMA VIRIDE

Eugene L. Dulaney, Saskatoon, Saskatchewan, Canada, and William J. McAleer, Roselle, N. J., assignors to Merck & Co., Inc., Rahway, N. J., a corporation of New Jersey No Drawing. Application December 27, 1955
Serial No. 555,279

8 Claims. (Cl. 195—51)

This application is a continuation-in-part of application Serial No. 396,316, filed December 4, 1953, and Serial No. 396,317, filed December 4, 1953, now abandoned.

This invention relates to a method of introducing oxygen substituents into a steroid molecule and particularly to a process of preparing 17α-hydroxy steroids by subjecting 17-desoxy steroids to the action of an oxygenating strain of microorganisms or their oxygenating enzymes.

The discovery of the remarkable therapeutic properties of cortisone, hydrocortisone and similar related compounds has stimulated wide interest in finding simpler and more economical methods of preparing such compounds. In the synthesis of these compounds, it is necessary to introduce a 17-hydroxy substituent. Although various methods have been developed for the synthesis of 17-hydroxy steroids, such processes are not entirely satisfactory and other methods more suitable for the commercial preparation of 17-hydroxy steroids in high yields have been sought.

Methods for effecting the oxygenation of steroids by the action of microorganisms are known in the art. For example, various Actinomycetes are known to introduce oxygen into a number of positions of the steroid molecule. Similarly, various species of genera included in the order Mucorales also introduce oxygen in various positions of the steroid ring structure.

It has been suggested to introduce oxygen substituents at position 17 by the action of various microorganisms but heretofore there has been no showing of such a procedure being actually accomplished.

A further difficulty is that many oxygenating microorganisms, such as various species of the Mucorales, are very specific in their nutritional requirements and therefore the culture mediums suitable for growing such microorganisms are limited. Also, the spores of many of the Phycomycetes, including the Mucorales, are destroyed by the lyophilization procedure; therefore great difficulty is encountered in retaining their desirable properties since the cultures are subject to degeneration. Further, the Mucorales grow very poorly under submerged conditions and, if any foam is allowed to collect on the surface of the fermentation liquor, the Mucorales collect in the foam and develop as a pellicle over the surface of the culture liquor. This formation of a surface pellicle is undesirable since such growth does not permit the microorganism to come in intimate contact with the steroid contained in the main body of the fermentation broth. Under these conditions, therefore, large amounts of antifoam agents are required which complicates the isolation of the desired oxygenated steroids.

A primary object of the present invention is to produce oxygenated steroids by a process not subject to the difficulties encountered in the processes previously available. A related object is to produce 17-hydroxy steroids by fermentation processes in economically feasible yields without the formation of undesirable side products. Other objects and the advantages of this invention will appear hereinafter.

In accordance with the present invention, it has been found that the oxygenation of steroids is conveniently effected by subjecting steroids to the action of an oxygenating strain of fungi of the species Trichoderma viride or to oxygenating enzymes produced by this organism. The practice of this invention is particularly suitable for converting 17-desoxy pregnenes to the corresponding 17-hydroxy pregnene in good yields without the excessive formation of undesirable side products. The ability of the microorganisms of the species Trichoderma viride to introduce a hydroxy group at the 17-carbon of the steroid nucleus is considered surprising since genera of the same family such as Penicillium and Aspergillus cause oxygenation in other positions of the steroid nucleus. Thus, this method provides a valuable means for introducing a 17-hydroxy substituent and thereby preparing hormones such as cortisone and other products suitable as intermediates for the production of compounds related thereto, such as hydrocortisone.

The processes of this invention are particularly valuable since the use of fungi of the species Trichoderma viride makes possible the introduction of a 17-hydroxy group by fermentation procedures. Thus, this invention provides an expedient fermentation procedure for the introduction of such a group that was heretofore introduced by involved organic synthesis necessitating a number of steps. Another advantage of this process is that the action of this species will introduce oxygen selectively at the 17 position. This is important since it results in the obtainment of much better yields of the desired product and makes possible the use of simpler methods for effecting its recovery.

Another advantage of the use of the species Trichoderma viride is that the starting material which is not converted to the 17-hydroxy steroid is not all destroyed by conversion to other polyhydroxylated side products and may therefore be conveniently recovered by extraction and then by recycling the recovered starting material the desired 17-hydroxy steroid is produced in good yield. This is of particular importance since the prior art methods resulted in the destruction of the expensive starting steroids. Another important characteristic of this process is the ability of the organism to grow on and oxidize sterols in a great variety of culture media. Further, the oxygenating strains of the species Trichoderma viride are very stable and can be lyophilized and stored without affecting their oxygenating characteristics. In addition, the fermentation with this species can be carried out in mediums containing only minor amounts of antifoam agents thereby further facilitating the recovery of the desired oxygenated products.

The oxygenating strains of the species Trichoderma viride employed in the process of this invention are of the class Fungi Imperfecti, the order Moniliales, and of the family Moniliaceae.

The microorganism Trichoderma viride can be obtained from known sources such as the Northern Regional Research Laboratories, Peoria, Illinois, under the number NRRL 2473. Alternately strains can be obtained from soil using techniques known to microbiologists.

In carrying out the process of this invention the steroid to be oxygenated is subjected to the action of an oxygenating enzyme produced by growing an oxygenating strain of fungi of the species Trichoderma viride. This is conveniently accomplished by growing the microorganism under aerobic conditions in a suitable nutrient medium in intimate contact with the steroid to be oxygenated; the culturing growth of the microorganism being continued until the desired oxygenation has occurred. Alternately the process is effected by the use of homogenized resting cells by first growing the microorganism in a suitable fermentation medium under aerobic conditions and then separating the cells from the fermentation medium and adding the steroid to these resting cells and continuing the aerobic conditions for sufficient time to effect the desired oxygenation. The use of resting cells has the advantage of simplifying the recovery procedure.

The steroid can be added to the nutrient medium as a suspension in a suitable solvent such as water, as a solution in a solvent such as acetone, propylene glycol, dimethylformamide or dimethylacetamide, or in a finely divided form such as a solid micronized powder. In general, it is desirable that the steroid be present in very finely divided form in order to permit maximum contact with the oxygenating culture medium and insure completion of the reaction. All of the steroid may be added at one time or the addition may be continuous or intermittent over a period of time.

The process of the present invention can be effected in both stationary and submerged cultures of the species *Trichoderma viride* growing under aerobic conditions, although for practical purposes it is most conveniently carried out by growing the microorganism under submerged conditions in a suitable aqueous fermentation medium containing the steroid. The amount of the steroid which can be conveniently oxygenated by our method will depend in part upon the particular medium employed.

Aqueous nutrient mediums suitable for the growing of oxygenating strains of *Trichoderma viride* must contain sources of assimilable carbon and nitrogen as well as minor amounts of inorganic salts. Any of the usual sources of assimilable carbon such as dextrose, cerelose, glucose, inverted molasses, and the like, employed in fermentation mediums can be used in carrying out the process of our invention. Similarly, complex sources of nitrogen usually employed in commercial fermentation process such as lactalbumin digest ("Edamine") and corn steep liquor, or inorganic sources of nitrogen such as dibasic ammonium phosphate, ammonium nitrate, and the like, are satisfactory for use in the fermentation mediums. Minor amounts of other substances such as nicotinamide or inorganic salts such as suitable soluble salts of magnesium, zinc, potassium, sodium, phosphorous, and iron are usually available in complex sources of carbon and nitrogen or may be conveniently added to the fermentation medium in minor amounts to promote maximum growth of the oxygenating microorganism.

The following are examples of suitable aqueous nutrient mediums which can be used in our process of oxygenating steroids:

*Medium No. 1*

| | G. |
|---|---|
| Commercial dextrose (cerelose) | 50.00 |
| Commercial lactalbumin digest (Edamine) | 20.00 |
| Corn steep liquor | 5.0 |

Distilled water is added to give a total volume of 1 liter of nutrient medium and the pH adjusted to 6.5 with sodium hydroxide.

*Medium No. 2*

| | G. |
|---|---|
| Inverted black strap molasses | 100.0 |
| Commercial lactalbumin digest (Edamine) | 20.0 |
| Corn steep liquor | 5.0 |

Distilled water is added to give a total volume of 1 liter of nutrient medium and the pH adjusted to 6.5 with sodium hydroxide.

*Medium No. 3*

| | G. |
|---|---|
| Inverted black strap molasses | 100.00 |
| Corn steep liquor | 20.0 |

Distilled water is added to give a total volume of 1 liter of nutrient medium and the pH adjusted to 6.5 with sodium hydroxide.

*Medium No. 4*

| | G. |
|---|---|
| Inverted black strap molasses | 100.0 |
| Corn steep liquor | 20.0 |

Distilled water is added to give a total volume of 1 liter of nutrient medium and the pH adjusted to 6.5 with sodium hydroxide.

*Medium No. 5*

| | G. |
|---|---|
| Inverted black strap molasses | 50.0 |
| Corn steep liquor | 6.3 |

Distilled water is added to give a total volume of 1 liter of nutrient medium and the pH adjusted to 6.5 with sodium hydroxide.

*Medium No. 6*

| | G. |
|---|---|
| Dextrose | 50.0 |
| $(NH_4)_2HPO_4$ | 7.5 |
| $K_2HPO_4$ | 1.0 |
| $MgSO_4.7H_2O$ | 0.5 |
| KCl | 0.5 |
| $FeSO_4.7H_2O$ | 0.01 |
| $ZnSO_4.7H_2O$ | 0.01 |

Distilled water is added to give a total volume of 1 liter of nutrient medium and the pH adjusted to 6.5 with sodium hydroxide.

*Medium No. 7*

| | G. |
|---|---|
| Edamine | 20.0 |
| Corn steep | 0.62 |
| Dextrose | 50.0 |

Distilled water is added to give a total volume of 1 liter of nutrient medium and the pH adjusted to 6.5.

The addition of minor amounts of anti-foaming agents, although not essential, is desirable with some fermentation mediums. It has been found that the addition to certain fermentation mediums of a substituted oxazoline which is a nonvolatile, amine-type, cationic surface active agent available under the trade name Alkaterge C is particularly effective in reducing the amount of foam, although other anti-foam agents known to be useful for this purpose can also be used.

As indicated above, the process of this invention is particularly useful in the oxygenation of 17-desoxy pregnenes including pregnadienes to obtain the corresponding 17-hydroxy pregnene. Other steroids, however, may be oxygenated thereby producing suitable intermediates in the preparation of hormones. Thus, this process is applicable in general to saturated and unsaturated cyclopentanopolyhydrophenanthrene compounds. Such cyclopentanopolyhydrophenanthrene compounds may be unsubstituted or may contain substituents such as keto, hydroxyl, acyloxy, halide, alkyl, and the like at various positions of the cyclopentanopolyhydrophenanthrene nucleus. In addition, such compounds may have at the 17 position a ketol side chain, a saturated or unsaturated hydrocarbon side chain, a carboxylic acid side chain, and the like. Examples of classes of such cyclopentanopolyhydrophenanthrene compounds that might be mentioned are pregnanes, allopregnanes, androstanes, bile acids and their esters, sterols, sapogenins, and derivatives thereof. Thus, representative steroids having a 17-desoxy group such as progesterone; 4 - pregnene - 21 - ol - 3,20 - dione - 21-acetate; desoxycorticosterone; 4 - pregnene - 3,20 - dione; 1,4 - pregnadiene - 11β,17α - diol - 3,20 - dione; 3 - keto cholanic acid; lithocholic acid; diosgenin; 5,6 - dichlorodiosgenin; 4 - pregnene - 3β - ol - 20 - one; 5,6 - dichloropregnane - 3β - ol - 20 - one; 5,6 - dichloropregnane - 21-ol-3,20-dione; and the like, can be oxygenated at position 17 to obtain the corresponding 17-hydroxy derivatives.

For example, a 17-desoxy pregnene can be oxygenated in accordance with the following procedure. A sterile culture medium, such as those shown above, is first inoculated by introducing a small amount of spore suspension or vegetative growth of an oxygenating strain of the species *Trichoderma viride*. The inoculated nutrient medium is then incubated at a temperature of about 20–45° C., while being agitated in the presence of oxygen for a period of about a few hours to several days. At this point, a solution of a 17-desoxy pregnene in a solvent such as propylene glycol is added to the fermentation medium and the agitation and aeration of the nutrient medium continued for about 5 to 30 hours, or until the oxygenation reaction is completed.

When the oxygenation is complete, the oxygenated steroid may be recovered from the fermentation broth by extraction with a suitable water immiscible organic solvent for the oxygenated steroids. Suitable solvents for this purpose that might be mentioned are chloroform, methylene chloride, 2-methyl-5-ethyl pyridine, organic acid esters, aromatic hydrocarbons, ketones and amides, and the like. The solvent solution containing the desired oxygenated steroid can then be evaporated to yield the desired product which may be further purified by recrystallization or other procedures conventional in the art.

Alternatively, the process of this invention can be effected by contacting the oxygenating enzymes produced by the fermentation of the species *Trichoderma viride* with the steroid to be oxygenated. This can be accomplished by recovering the oxygenating enzymes from a fermentation broth in accordance with procedures known in the art, and intimately contacting such enzymes with a steroid in an aqueous medium.

The following examples are given for purpose of illustration.

EXAMPLE 1

Approximately 50 ml. of a culture medium having the composition described as medium #1 was sterilized for 30 minutes at 120° C. in a 250 ml. flask. The medium was then inoculated with approximately three ml. of a vegetative growth of culture *Trichoderma viride*. The mixture was then agitated using a rotary shaker at an agitation speed of 220 R. P. M., while maintaining the temperature at 28° C. for approximately 72 hours. A sterile solution of 10 mg. of 4-pregnene-3,20-dione in 2.5 ml. of propylene glycol was added to the fermented medium and the agitation continued at the same rate for approximately 48 hours. The batch was then filtered and extracted with chloroform. The chloroform extracts were developed on a paper chromatogram using the Zaffaroni technique reported in Science III, 6 (1950) and the solvent system ligroin propylene glycol: methanol. A spot was observed with a $R_f$ corresponding to 4-pregnene-17α-ol-3,20-dione and which gave a vanillin-sulfuric acid test characteristic of 4-pregnene-17α-ol-3,20-dione.

EXAMPLE 2

Approximately 50 ml. of a culture medium having the composition described as medium #7 was sterilized for 30 minutes at 120° C. in a 250 ml. flask. The medium was then inoculated with approximately three ml. of a vegetative growth of culture *Trichoderma viride*. The mixture was then agitated using a rotary shaker at an agitation speed of 220 R. P. M., for approximately 48 hours while maintaining the temperature at 28° C. A sterile solution of 10 mg. of 4-pregnene-3,20-dione in 2.5 ml. of propylene glycol was added to the fermented medium and the agitation continued at the same rate for 48 hours. At the end of this period the batch was filtered and extracted with chloroform and the entire extract spotted and developed as in Example 1. The extract gave significant quantities of the oxidation product opposite 4-pregnene-17α - ol-3,20 - dione. The band opposite 4-pregnene-17α-ol-3,20-dione was cut out and eluted with methanol. The methanol eluate was concentrated in vacuo and the residue treated with concentrated sulfuric acid. The ultraviolet spectrum in concentrated sulfuric acid was found to be similar to that of 4-pregnene-17α-ol-3,20-dione.

EXAMPLE 3

A process was carried out in the same manner as Example 2 except that 10 mg. 4-pregnene-11β-ol-3,20-dione was added in place of the 4-pregnene-3,20-dione. The product spotted and developed as in Example 1 gave significant quantities of the oxidation product opposite 4-pregnene-11β,17-diol-3,20-dione.

EXAMPLE 4

Sixty samples of approximately 50 ml. each of a culture medium having the composition described as medium #1 were placed in 250 ml. flasks and sterilized for 30 minutes at 120° C. The mediums were then each inoculated with approximately five ml. of a vegetative growth of culture F5–1688. The mixtures were then agitated using a rotary shaker at an agitation speed of 220 R. P. M. while maintaining the temperature at 28° C. for approximately 48 hours. A sterile solution of 10 mg. of 4-pregnene-3,20-dione in 2.5 ml. of propylene glycol were added to each of the sixty fermented mediums and the agitation continued at the same rate for 48 hours. The fermentation broths were then filtered and pooled. The filtered broth was extracted twice with two liter portions of ethyl acetate and the mycelia was one liter of ethyl acetate. The extract solutions were combined and evaporated to dryness. The residue was then partitioned between 70% aqueous ethanol and petroleum ether. The petroleum ether layer was discarded, the ethanol layer concentrated in vacuo and the aqueous residue extracted with chloroform. The chloroform extract was chromatographed over silica gel by first washing with benzene and following with 5%, 25% and 50% ethyl acetate in benzene. The crystalline fraction obtained in the 50% ethyl acetate eluate was found to be 4-pregnene-17α-ol-3,20 dione.

EXAMPLE 5

Approximately 50 ml. of a culture medium having the composition described as medium #1 was sterilized for 20 minutes at 120° C. in a 250 ml. flask. The medium was then inoculated with approximately five ml. of a vegetative growth of culture F5—1688. The mixture was then agitated using a rotary shaker at an agitation speed of 220 R. P. M. for approximately 48 hours while maintaining the temperature of 28° C. A sterile solution of 10 mg. of 4-pregnene-21-ol-3,20-dione in 2.5 ml. of propylene glycol was added to the fermented medium and the agitation continued at the same rate for 48 hours. At the end of this period the batch was filtered and extracted with chloroform and the entire extract spotted and developed as in Example 1. The extract gave significant quantities of the oxidation product opposite 4-pregnene-17α,21-diol-3,20-dione. The ultraviolet spectrum in concentrated sulfuric acid was found to be similar to that of 4-pregnene-17α,21-diol-3,20-dione.

Any departure from the above description which conforms to the present invention is intended to be included within the scope of the claims.

What is claimed is:

1. A process for the production of 17α-hydroxy steroids, which comprises subjecting a 17-desoxy steroid selected from the group consisting of pregnadienes, pregnanes and allopregnanes under aerobic conditions to the action of an oxygenating enzyme produced by an oxygenating strain of the species *Trichoderma viride*.

2. The process of claim 1 wherein the 17-desoxy steroid is 4-pregnene-3,20-dione.

3. The process of claim 1 wherein the 17-desoxy steroid is 4-pregnene-11β-ol-3,20-dione.

4. The process of claim 1 wherein the 17-desoxy steroid is 4-pregnene-21-ol-3,20-dione.

5. A process which comprises growing an oxygenating strain of a microorganism of the species *Trichoderma viride* under aerobic conditions in a nutrient medium containing assimilable sources of carbon and nitrogen in intimate contact with a 17-desoxy steroid selected from the group consisting of pregnenes, pregnadienes, pregnanes and allopregnanes to produce the corresponding 17α-hydroxy steroid.

6. A process which comprises growing an oxygenating strain of a microorganism of the species *Trichoderma viride* in an aqueous nutrient medium containing sources of assimilable carbon and nitrogen under aerobic submerged conditions in intimate contact with a 17-desoxy steroid selected from the group consisting of pregnenes, pregnadienes, pregnanes and allopregnanes to produce the corresponding 17α-hydroxy steroid.

7. A process which comprises growing an oxygenating strain of a microorganism of the species *Trichoderma viride* (NRRL 2473) under aerobic conditions in an aqueous medium comprising assimilable sources of carbon and nitrogen and a 17-desoxy steroid, selected from the group consisting of pregnenes, pregnadienes, pregnanes and allopregnanes and isolating a 17α-hydroxy steroid from the resulting fermentation broth.

8. A process which comprises growing an oxygenating strain of a microorganism of the species *Trichoderma viride* under aerobic conditions in an aqueous nutrient medium comprising dextrose, lactalbumin digest and corn steep liquor in intimate contact with a 17-desoxy steroid selected from the group consisting of pregnenes, pregnadienes, pregnanes and allopregnanes to produce the corresponding 17α-hydroxy steroid.

References Cited in the file of this patent

Fried et al.: J. A. C. S., 75, No. 20, 1953, pp. 5764, 5765.

Meystre et al.: Helvetica Chimica Acta, 37, 1954, pp. 1548 to 1553.